US010676354B2

United States Patent
Finnerty et al.

(10) Patent No.: US 10,676,354 B2
(45) Date of Patent: *Jun. 9, 2020

(54) REFORMER WITH PEROVSKITE AS STRUCTURAL COMPONENT THEREOF

(71) Applicant: Watt Fuel Cell Corp., Mount Pleasant, PA (US)

(72) Inventors: Caine M. Finnerty, Port Washington, NY (US); Paul DeWald, Scottsdale, PA (US)

(73) Assignee: Watt Fuel Cell Corp., Mount Pleasant, PA (US)

( * ) Notice: Subject to any disclaimer, the term of this patent is extended or adjusted under 35 U.S.C. 154(b) by 278 days.

This patent is subject to a terminal disclaimer.

(21) Appl. No.: 15/033,838

(22) PCT Filed: Nov. 4, 2014

(86) PCT No.: PCT/US2014/063817
§ 371 (c)(1),
(2) Date: May 2, 2016

(87) PCT Pub. No.: WO2015/069621
PCT Pub. Date: May 14, 2015

(65) Prior Publication Data
US 2016/0280541 A1    Sep. 29, 2016

Related U.S. Application Data

(60) Provisional application No. 61/900,510, filed on Nov. 6, 2013, provisional application No. 61/900,529, filed
(Continued)

(51) Int. Cl.
*C01B 3/40*       (2006.01)
*C01B 3/38*       (2006.01)
(Continued)

(52) U.S. Cl.
CPC ............... *C01B 3/40* (2013.01); *B01J 7/00* (2013.01); *B01J 12/007* (2013.01);
(Continued)

(58) Field of Classification Search
CPC .. H01M 8/004; H01M 8/0618; H01M 8/0625; C01B 3/40; C01B 3/386; B01J 7/00; B01J 12/007; B01J 19/2425
See application file for complete search history.

(56) References Cited

U.S. PATENT DOCUMENTS

| 2,945,077 A | 7/1960 | Polk |
| 3,518,284 A | 6/1970 | Foster |

(Continued)

FOREIGN PATENT DOCUMENTS

| CN | 1655868 A | 8/2005 |
| EP | 1382382 A1 | 1/2004 |

(Continued)

OTHER PUBLICATIONS

C. Finnerty, K. Kendall, G. A. Tompsett, Integrated Catalytic Burner/Micro-SOFC Design and Applications Electrochemistry, 68 (2) (2000) 519-521.
(Continued)

*Primary Examiner* — James Lee
(74) *Attorney, Agent, or Firm* — Dilworth & Barrese, LLP

(57) ABSTRACT

A reformer includes at least one reformer reactor unit (300) having a space-confining wall with external (307) and internal surfaces (306), at least a section of the wall and space confined thereby defining a reforming reaction zone (311), an inlet end (301) and associated inlet (302) for admission of flow of gaseous reforming reactant to the reforming reaction zone (311), an outlet end (303) and associated outlet (304) for outflow of hydrogen-rich refor- (Continued)

mate produced in the reforming reaction zone (311), at least that section of the wall (305) corresponding to the reforming reaction zone comprising perovskite as a structural component thereof such wall section being gas-permeable to allow gaseous reforming reactant to diffuse therein and hydrogen-rich reformate to diffuse therefrom.

16 Claims, 5 Drawing Sheets

Related U.S. Application Data on Nov. 6, 2013, provisional application No. 61/900,543, filed on Nov. 6, 2013, provisional application No. 61/900,552, filed on Nov. 6, 2013.

(51) Int. Cl.

| | | |
|---|---|---|
| *H01M 8/0612* | (2016.01) | |
| *H01M 8/0668* | (2016.01) | |
| *H01M 8/00* | (2016.01) | |
| *B01J 19/24* | (2006.01) | |
| *B01J 12/00* | (2006.01) | |
| *B01J 7/00* | (2006.01) | |
| *B01J 23/26* | (2006.01) | |
| *B01J 23/34* | (2006.01) | |
| *B01J 23/63* | (2006.01) | |
| *B01J 23/652* | (2006.01) | |
| *B01J 23/83* | (2006.01) | |
| *B01J 35/04* | (2006.01) | |
| *H01M 8/12* | (2016.01) | |
| *H01M 8/124* | (2016.01) | |

(52) U.S. Cl.
CPC ....... *B01J 19/2415* (2013.01); *B01J 19/2425* (2013.01); *B01J 19/2475* (2013.01); *B01J 23/26* (2013.01); *B01J 23/34* (2013.01); *B01J 23/63* (2013.01); *B01J 23/6522* (2013.01); *B01J 23/83* (2013.01); *B01J 35/04* (2013.01); *C01B 3/386* (2013.01); *H01M 8/004* (2013.01); *H01M 8/0618* (2013.01); *H01M 8/0625* (2013.01); *H01M 8/0668* (2013.01); *H01M 8/12* (2013.01); *B01J 2219/00157* (2013.01); *C01B 2203/0233* (2013.01); *C01B 2203/0244* (2013.01); *C01B 2203/0261* (2013.01); *C01B 2203/0283* (2013.01); *C01B 2203/044* (2013.01); *C01B 2203/047* (2013.01); *C01B 2203/066* (2013.01); *C01B 2203/1005* (2013.01); *C01B 2203/1041* (2013.01); *C01B 2203/1047* (2013.01); *C01B 2203/1052* (2013.01); *C01B 2203/1058* (2013.01); *C01B 2203/1064* (2013.01); *H01M 2008/1293* (2013.01); *Y02P 20/52* (2015.11)

(56) References Cited

U.S. PATENT DOCUMENTS

| | | |
|---|---|---|
| 3,560,167 A | 2/1971 | Bruckner et al. |
| 4,588,659 A | 5/1986 | Abens et al. |
| 4,751,057 A | 6/1988 | Westerman |
| 4,894,205 A | 1/1990 | Westerman et al. |
| 5,149,156 A | 9/1992 | Kleefeldt |
| 5,149,516 A | 9/1992 | Han et al. |
| 5,447,705 A | 9/1995 | Petit et al. |
| 5,527,631 A | 6/1996 | Singh et al. |
| 5,573,737 A | 11/1996 | Balachandran et al. |
| 5,596,514 A | 1/1997 | Maher, Jr. et al. |
| 5,648,582 A | 7/1997 | Schmidt et al. |
| 5,690,763 A | 11/1997 | Ashmead et al. |
| 6,033,793 A | 3/2000 | Woods et al. |
| 6,284,398 B1 | 9/2001 | Kiryu |
| 6,296,814 B1 | 10/2001 | Bonk et al. |
| 6,378,556 B1 | 4/2002 | Zeng et al. |
| 6,383,469 B1 | 5/2002 | Lamla et al. |
| 6,383,670 B1 | 5/2002 | Edlund et al. |
| 6,402,989 B1 | 5/2002 | Gaffney |
| 6,405,040 B1 | 6/2002 | Van Keulen et al. |
| 6,447,940 B1 | 9/2002 | Ueda |
| 6,458,334 B1 | 10/2002 | Tamhankar et al. |
| 6,465,118 B1 | 10/2002 | Dickman et al. |
| 6,488,838 B1 | 12/2002 | Tonkovich et al. |
| 6,488,907 B1 | 12/2002 | Barnes et al. |
| 6,492,050 B1 | 12/2002 | Sammes |
| 6,521,204 B1 | 2/2003 | Borup et al. |
| 6,565,817 B1 | 5/2003 | Kiryu |
| 6,576,359 B2 | 6/2003 | Fronk |
| 6,585,940 B2 | 7/2003 | Abe et al. |
| 6,641,625 B1 | 11/2003 | Clawson et al. |
| 6,641,795 B2 | 11/2003 | Abe |
| 6,656,623 B2 | 12/2003 | Holmes et al. |
| 6,667,123 B2 | 12/2003 | Yu |
| 6,673,270 B1 | 1/2004 | De Jong et al. |
| 6,692,707 B1 | 2/2004 | Hirabayashi |
| 6,699,609 B2 | 3/2004 | Kotani et al. |
| 6,702,960 B1 | 3/2004 | Schaddenhorst et al. |
| 6,726,853 B2 | 4/2004 | Okado et al. |
| 6,749,958 B2 | 6/2004 | Pastula et al. |
| 6,770,106 B1 | 8/2004 | Okamoto et al. |
| 6,783,742 B2 | 8/2004 | Bentley et al. |
| 6,790,247 B2 | 9/2004 | Childress et al. |
| 6,790,431 B2 | 9/2004 | Wang et al. |
| 6,800,387 B2 | 10/2004 | Shimada et al. |
| 6,833,208 B2 | 12/2004 | Kotani et al. |
| 6,833,536 B2 | 12/2004 | Shigeura |
| 6,869,456 B2 | 3/2005 | Salemi et al. |
| 6,872,379 B2 | 3/2005 | Zahringer et al. |
| 6,878,667 B2 | 4/2005 | Gaffney et al. |
| 6,881,508 B2 | 4/2005 | Penev |
| 6,867,436 B1 | 5/2005 | Fisher et al. |
| 6,887,456 B2 | 5/2005 | Xu et al. |
| 6,921,596 B2 | 7/2005 | Kelly et al. |
| 6,932,950 B1 | 8/2005 | Guetlhuber |
| 6,984,371 B2 | 1/2006 | Zhao et al. |
| 7,001,867 B2 | 2/2006 | Jin et al. |
| 7,037,349 B2 | 3/2006 | Dauer et al. |
| 7,048,897 B1 | 5/2006 | Koripella et al. |
| 7,070,633 B2 | 7/2006 | Okada et al. |
| 7,070,752 B2 | 7/2006 | Zeng et al. |
| 7,090,826 B2 | 8/2006 | Jiang et al. |
| 7,101,531 B2 | 9/2006 | Kamijo |
| 7,115,233 B2 | 10/2006 | Okada et al. |
| 7,118,717 B2 | 10/2006 | Shore |
| 7,132,184 B2 | 11/2006 | Ogino et al. |
| 7,147,836 B2 | 12/2006 | Ebert et al. |
| 7,147,946 B2 | 12/2006 | Kawasumi et al. |
| 7,156,868 B1 | 1/2007 | Nakamura et al. |
| 7,189,371 B2 | 3/2007 | Iwasaki |
| 7,192,458 B1 | 3/2007 | Harness et al. |
| 7,232,352 B2 | 6/2007 | Splaine |
| 7,247,258 B2 | 7/2007 | Jung et al. |
| 7,285,247 B2 | 10/2007 | Smaling et al. |
| 7,294,421 B2 | 11/2007 | Noetzel et al. |
| 7,323,148 B2 | 1/2008 | Shah et al. |
| 7,328,691 B2 | 2/2008 | Hataura et al. |
| 7,335,432 B2 | 2/2008 | Koripella |
| 7,344,572 B2 | 3/2008 | Yamamoto |
| 7,344,687 B2 | 3/2008 | Oi et al. |
| 7,364,812 B2 | 4/2008 | Taylor et al. |
| 7,368,482 B2 | 5/2008 | Basini et al. |
| 7,422,810 B2 | 9/2008 | Venkataraman et al. |
| 7,490,580 B2 | 2/2009 | Hanai et al. |
| 7,578,861 B2 | 8/2009 | Kah et al. |
| 7,585,810 B2 | 9/2009 | Chen et al. |
| 7,625,414 B2 | 12/2009 | Nougier et al. |
| 7,632,320 B2 | 12/2009 | Tonkovich et al. |
| 7,691,509 B2 | 4/2010 | Han et al. |
| 7,704,618 B2 | 4/2010 | Venkataraman et al. |

(56) References Cited

U.S. PATENT DOCUMENTS

| | | | |
|---|---|---|---|
| 7,736,399 B2 | 6/2010 | Ravenda et al. | |
| 7,846,599 B2 | 12/2010 | Ballantine et al. | |
| 7,858,214 B2 | 12/2010 | Kelly et al. | |
| 7,888,278 B2 | 2/2011 | Rapier et al. | |
| 7,901,814 B2 | 3/2011 | Venkataraman et al. | |
| 7,976,787 B2 | 7/2011 | England et al. | |
| 7,985,506 B2 | 7/2011 | Lee et al. | |
| 7,985,509 B2 | 7/2011 | Kim et al. | |
| 7,996,466 B2 | 10/2011 | Van Dijk et al. | |
| 8,034,504 B2 | 10/2011 | Tsunoda et al. | |
| 8,062,800 B2 | 11/2011 | Cho et al. | |
| 8,142,941 B2 | 3/2012 | Bitoh | |
| 8,158,289 B2 | 4/2012 | Cutright et al. | |
| 8,173,310 B2 | 5/2012 | Son | |
| 8,241,600 B1 | 8/2012 | Berry et al. | |
| 8,257,669 B2 | 9/2012 | Jankowski | |
| 8,277,524 B2 | 10/2012 | Keegan et al. | |
| 8,298,711 B2 | 10/2012 | Yanase et al. | |
| 8,304,122 B2 | 11/2012 | Pushusta et al. | |
| 8,318,363 B2 | 11/2012 | Lim | |
| 8,323,365 B2 | 12/2012 | Drnevich et al. | |
| 8,337,757 B2 | 12/2012 | Roychoudhury et al. | |
| 8,354,083 B2 | 1/2013 | Amsden et al. | |
| 8,486,162 B2 | 7/2013 | Kim et al. | |
| 8,557,451 B2 | 10/2013 | Edlund et al. | |
| 9,624,104 B2* | 4/2017 | Finnerty | B01J 19/0013 |
| 9,627,699 B2* | 4/2017 | Finnerty | H01M 8/0618 |
| 9,627,700 B2* | 4/2017 | Finnerty | B01J 12/007 |
| 9,627,701 B2* | 4/2017 | Finnerty | B01J 12/007 |
| 2003/0054215 A1 | 3/2003 | Doshi et al. | |
| 2003/0064259 A1 | 4/2003 | Gittleman | |
| 2003/0188486 A1 | 10/2003 | Tanaka et al. | |
| 2003/0211021 A1 | 11/2003 | Oi et al. | |
| 2003/0211373 A1 | 11/2003 | Ueda et al. | |
| 2003/0218991 A1 | 11/2003 | Besecker et al. | |
| 2003/0234455 A1 | 12/2003 | Mieney et al. | |
| 2003/0235726 A1 | 12/2003 | Kelly et al. | |
| 2004/0009104 A1 | 1/2004 | Kaupert et al. | |
| 2004/0076562 A1 | 4/2004 | Manzanec et al. | |
| 2004/0144030 A1 | 7/2004 | Smaling | |
| 2004/0180247 A1 | 9/2004 | Higashiyama et al. | |
| 2004/0191591 A1 | 9/2004 | Yamamoto | |
| 2005/0008907 A1 | 1/2005 | Isozaki et al. | |
| 2005/0028445 A1 | 2/2005 | Roychoudhury et al. | |
| 2005/0069485 A1 | 3/2005 | Jung et al. | |
| 2005/0081444 A1 | 4/2005 | Anumakonda et al. | |
| 2005/0164046 A1 | 7/2005 | Fujihara et al. | |
| 2005/0188615 A1 | 9/2005 | Sennoun et al. | |
| 2005/0191533 A1 | 9/2005 | Kim et al. | |
| 2005/0267606 A1 | 12/2005 | Barlett, Jr. et al. | |
| 2006/0051634 A1 | 3/2006 | DeVries | |
| 2006/0067861 A1 | 3/2006 | Torkovich et al. | |
| 2006/0133976 A1 | 5/2006 | Male et al. | |
| 2006/0179171 A1 | 8/2006 | LaBarge | |
| 2006/0246333 A1 | 11/2006 | Schaevitz et al. | |
| 2007/0084118 A1 | 4/2007 | Kaeding et al. | |
| 2007/0104641 A1 | 5/2007 | Ahmed et al. | |
| 2007/0183949 A1 | 8/2007 | Fischer | |
| 2007/0289215 A1 | 12/2007 | Hemmings et al. | |
| 2008/0138273 A1 | 6/2008 | Jiang | |
| 2008/0152970 A1 | 6/2008 | Rush et al. | |
| 2008/0169449 A1* | 7/2008 | Mundschau | B01D 69/141 252/373 |
| 2008/0187797 A1 | 8/2008 | Edlund | |
| 2009/0029205 A1 | 1/2009 | Venkatamaran et al. | |
| 2009/0104482 A1 | 4/2009 | Miyazaki | |
| 2009/0208784 A1 | 8/2009 | Perry et al. | |
| 2009/0291335 A1 | 11/2009 | Anzai | |
| 2010/0015479 A1 | 1/2010 | Rusch et al. | |
| 2010/0062292 A1 | 3/2010 | Lin et al. | |
| 2010/0119894 A1 | 5/2010 | Ishida | |
| 2010/0203404 A1 | 8/2010 | Miyazaki | |
| 2010/0330446 A1 | 12/2010 | Lucka et al. | |
| 2011/0039175 A1 | 2/2011 | Yokoyama et al. | |
| 2011/0185483 A1 | 7/2011 | Yamamoto et al. | |
| 2011/0189578 A1 | 8/2011 | Crumm et al. | |
| 2011/0195333 A1* | 8/2011 | Crumm | H01M 8/0247 429/466 |
| 2011/0269032 A1 | 11/2011 | Fischer et al. | |
| 2012/0062166 A1 | 3/2012 | Thornton et al. | |
| 2012/0088167 A1 | 4/2012 | Reiners et al. | |
| 2012/0164547 A1 | 6/2012 | Weingaerthner et al. | |
| 2012/0328969 A1 | 12/2012 | Dewald et al. | |
| 2013/0028815 A1 | 1/2013 | Basini et al. | |
| 2013/0056911 A1 | 3/2013 | Finnerty et al. | |
| 2013/0059223 A1 | 3/2013 | Finnerty et al. | |
| 2013/0230787 A1 | 9/2013 | Finnerty et al. | |
| 2014/0335463 A1 | 11/2014 | Friedrich et al. | |

FOREIGN PATENT DOCUMENTS

| | | |
|---|---|---|
| EP | 1787950 A2 | 5/2007 |
| GB | 1314984 A | 4/1973 |
| JP | 5186203 A | 7/1993 |
| JP | 2001224963 A | 8/2001 |
| JP | 2001518045 A | 10/2001 |
| JP | 2004502623 A | 1/2004 |
| JP | 2005186203 A | 7/2005 |
| JP | 2005535434 A | 11/2005 |
| JP | 2006505387 A | 2/2006 |
| JP | 2008007372 A | 1/2008 |
| JP | 2008031024 A | 2/2008 |
| JP | 2011212603 A | 10/2011 |
| JP | 2013065506 A | 4/2013 |
| WO | 98/41394 A1 | 9/1998 |
| WO | 9841294 | 9/1998 |
| WO | 9841394 A1 | 9/1998 |
| WO | 02099917 A2 | 12/2002 |
| WO | 2004/091771 A1 | 10/2004 |
| WO | 2006032644 A1 | 3/2006 |
| WO | 2006034868 A1 | 4/2006 |
| WO | 2008/031024 A1 | 3/2008 |
| WO | 2008031024 A1 | 3/2008 |
| WO | 2009116977 A2 | 9/2009 |
| WO | 2011/019825 A2 | 2/2011 |
| WO | 2011019825 A2 | 2/2011 |

OTHER PUBLICATIONS

K. Kendall, C. Finnerty, G.A. Tompsett, P. Windibank, and N. Coe, "Rapid Heating SOFC System for Hybrid Applications." Electrochemistry, vol. 68, No. 6, (2000) 403.

Finnerty C., Cunningham R. H., Ormerod R.M, "Development of a novel test system for in situ catalytic, electrocatalytic and electrochemical studies of internal fuel reforming in solid oxide fuel cells." Catalysis letters, vol. 66, No. 4, (2000) 221-226(6).

C. Finnerty, N.J. Coe, R.N. Cunningham and R.M. Ormerod, "Steam Reforming and Partial Oxidation of Methane over nickel/zirconia and doped nickel/zirconia anodes in working solid oxide fuel cells." Catalysis Today, in press (1998).

C. Finnerty, R.H. Cunningham and R.M. Ormerod, "Development of more tolerant nickel/zirconia anodes for solid oxide fuel cells running on natural gas." Proc. 3rd Eur. Conf. on SOFCs, 1998, 217-226.

C. Finnerty, R.H. Cunningham and R.M. Ormerod, "Combined Electrochemical and Catalytic studies of anodes in working solid oxide fuel cells" Proc. 3rd Eur. Conf. on SOFCs, 1998, 227-236.

C. Finnerty. R.H. Cunningham and R.M. Ormerod, "Study of the Catalysis and Surface Chemistry occurring at nickel/zirconia anodes in solid oxide fuel cells running on natural gas." Radiation Effects and Defects in Solids [ISSN 1042-0150]. vol. 151 pp. 77-82.

C. Finnerty, R.H. Cunningham, K. Kendall and R.M. Ormerod, "A novel test system for in situ catalytic and electrochemical measurements on fuel processing anodes in working solid oxide fuel cells." J. Chem. Soc. Chem. Comm., (1998) 915.

R.H. Cunningham, C. Finnerty, K. Kendall and R.M. Ormerod, "An in situ catalytic and electrochemical study of working nickel/zirconia anodes in tubular Solid Oxide Fuel Cells." Proc. 5th Int. Symp. on SOFCs, The Electrochem. Soc., 1997, 965-972.

(56) References Cited

OTHER PUBLICATIONS

R.N. Cunningham, C. Finnerty and R.M. Ormerod, "Study of Surface Carbon formed on working anodes of Solid Oxide Fuel Cells running on methane" Proc. 5th Int. Symp. on SOFCs, The Electrochem, Soc., 1997, 973-983.
Finnerty C, Cunningham RH, Ormerod RM, "Development of a novel solid oxide fuel cell system based on a tubular zirconia reactor." Radiaton Effects and Defects in Solids [ISSN 1042-0150]. vol. 151 pp. 71-76.
Finnerty, Caine, and David Coimbra, "Solid oxide fuel cells with novel internal geometry." U.S. Pat. No. 6,998,187. Feb. 14, 2006.
Finnerty C, Alston T, Ormerod RM, Kendall K, "A Solid Oxide Fuel Cell Demonstration Kit, Operated on Butane/Propane Portable Fuel Cells" Jun. 1999. ISBN 3-905592-3-7, Edited by F N Buchi, European Fuel Cell Forum.
Finnerty C, Cunningham RH, Ormerod RM, "In situ catalytic, electrocatalytic and electrochemical studies of fuel processing anodes in solid oxide fuel cells running on natural gas." Proceedings of 12th International Conference on Solid-state Ionics, Halkidiki, Greece Jun. 1999, International Society for Solid-state Ionics.
Finnerty C, Cunningham RH, Ormerod RM, "Internal reforming over Nickel/Zirconia Anodes in SOFCs: Influence of anode formulation, pre-treatment and operating conditions." Solid Oxide Fuel Cells VI Oct. 1999. 1999, Edited by S.C Singhal and M. Dokiya, Published by the Electrochemical Society, ISBN 1-56677-242-7.
Finnerty C, Ormerod RM, "Internal reforming and electrochemical performance studies of Doped Nickel/Zirconia anodes in SOFCs running on methane." Solid Oxide Fuel Cells VI, Oct. 1999. 1999, Edited by S.C Singhal and M. Dokiya, Published by the Electrochemical Society, ISBN 1-56677-242-7.
Caine Finnerty, Geoff. A. Tompsett, Kevin Kendall and R. Mark Ormerod, "SOFC system with integrated catalytic fuel processing." Journal of Power Sources, vol. 86, Issues 1-2, Mar. 2000, pp. 459-463.
Caine Finnerty, Neil J. Coe, Robert H. Cunningham and R. Mark Ormerod. "Carbon formation on and deactivation of nickel-based/zirconia anodes in solid oxide fuel cells running on methane." Catalysis Today, vol. 46, Issues 2-3, Nov. 16, 1998, pp. 137-145.
K. Kendall, C. Finnerty, G. Saunders and J. T. Chung, "Effects of dilution on methane entering an SOFC anode" Journal of Power Sources, vol. 106, Issues 1-2, Apr. 1, 2002, pp. 323-327.
G. A. Tompsett, C. Finnerty, K. Kendall, T. Alston and N. M. Sammes, "Novel applications for micro-SOFCs." Journal of Power Sources, vol. 86, Issues 1-2, Mar. 2000, pp. 376-382.
Caine Finnerty and R. Mark Ormerod, "Internal reforming over nickel/zirconia anodes in SOFCS operating on methane: influence of anode formulation, pre-treatment and operating conditions." Journal of Power Sources, vol. 86, Issues 1-2, Mar. 2000, pp. 390-394.
C. Finnerty, T. Alston, K. Kendall and R.M. Ormerod, "Development of a small portable SOFC system with integrated catalytic fuel processing." Sixth Grove Fuel Cell Symposium, Sep. 1999, 125.
C. Finnerty. K. Kendall, J. C. Austin, T. Alston , "Ceramic fuel cells to replace metal burners." Journal of Material science, 36, (2001) 1119-1124.
Ormerod RM, Finnerty CM, Cunningham RH, "In situ catalytic and electrocatalytic studies of internal fuel reforming in solid oxide fuel cells running on natural gas." Studies in Surface Science and Catalysis, Elsevier, [ISBN 0-444-50480-X]. 7 pp. 425-431.
P.K. Cheekatamarla, C.M. Finnerty et al., "Highly Efficient Next-Generation Tubular Solid Oxide Fuel Cells Powered by Readily Available Hydrocarbon Fuels", To be submitted to Nature, 2008.
P.K. Cheekatamarla, C. M. Finnerty, "Synthesis gas generation via partial oxidation reforming of liquid fuels." Accepted for publication, International Journal of Hydrogen Energy, 2008.
Y. Du, C. Finnerty, and J. Jiang, "Thermal Stability of Portable Microtubular SOFCs and Stacks." In press, Journal of the Electrochemical Society, 155(9), 1-XXXX, (2008).
Y. Du, C. Finnerty, and J. Jiang, "Thermal Stability of Portable Micro-Tubular Solid Oxide Fuel Cell and Stack" ECS Trans. 12, (1) 363 (2008).
P.K. Cheekatamarla, C.M. Finnerty , Jun Cai, "Internal reforming of hydrocarbon fuels in tubular solid oxide fuel cells." International Journal of Hydrogen Energy, vol. 33, Issue 7, Apr. 2008, pp. 1853-1858.
Praveen K. Cheekatamarla, C.M. Finnerty, "Reforming catalysts for hydrogen generation in fuel cell applications." Journal of Power Sources, vol. 160, Issue 1, Sep. 29, 2006, pp. 490-499.
P.K. Cheekatamarla, C.M. Finnerty, "Hydrogen Generation via partial oxidation reforming of liquid fuels." Prepr. Pap.-Am. hem. Soc., Div. Fuel Chem. 2007, 52(2), 288.
P.K. Cheekatamarla, C.M. Fennerty , Jun Cai, "Internal reforming of hydrocarbon fuels in tubular solid oxide fuse cells." ECS Trans, 12, (1) 438 (2008).
P. K. Cheekatamarla, C. M. Finnerty, A. Stanley, C. Robinson, P. Dewald, Y. Lu, Y. Du, "Performance Characteristics of an integrated Portable JP8 SOFC—Reformer System." ECS Transactions vol. 5, Mar. 2007.
C.M. Finnerty, Y. Du, P.K. Cheekatamarla, B.J. Emley, W. Zhu, J. Cai, R. Sharp, "Geometric Effects on Tubular Solid Oxide Fuel Cells." ECS Transactions—Solid Oxide Fuel Cells, vol. 7, Jun. 2007.
C. Finnerty, C. Robinson, S. Andrews, Y. Du, P. Cheekatamarla, P. Dewald, Y. Lu, T. Schwartz, "Portable Propane Micro-Tubular SOFC System Development." ECS Transactions—Solid Oxide Fuel Cells, vol. 7, Jun. 2007.
D. Bhattacharya, R. Rengaswamy and C. Finnerty, "Isothermal Models for Tubular Anode Supported Solid Oxide Fuel Cell", Chemical Engineering Science, 62(16), pp. 4250-4267, 2007.
D. Bhattacharya, R. Rengaswamy and C. Finnerty, "Dynamic Simulation and Analysis of a Solid Oxide Fuel Cell", in the proceedings of ESCAPE-17, Bucharest, 2007.
Debangsu Bhattacharya, Raghunathan Rengaswamy and Caine Finnerty, "Validation of a Phenomenological Steady-State Model for Solid Oxide Fuel Cell (SOFC)", presented at the Annual AIChE meeting, San Francisco, 2006.
Debangsu Bhattacharya, Raghunathan Rengaswamy and Caine Finnerty, "A Twodimensional Dynamic Model for Tubular Solid Oxide Fuel Cell", presented at the Annual AIChE meeting, San Francisco, 2006.
Debangsu Bhattacharya, Raghunathan Rengaswamy and Caine Finnerty, "Optimization Studies on Anode-Supported Tubular Solid Oxide Fuel Cells", presented at the Annual AIChE Meeting, Salt Lake City, 2007.
Debangsu Bhattacharya, Raghunathan Rengaswamy and Caine Finnerty, "Dynamics and Volterra-Model Based Control of a Tubular Solid Oxide Fuel Cell", presented at the Annual AIChE Meeting, Salt Lake City, 2007.
Debangsu Bhattacharya, Raghunathan Rengaswamy and Caine Finnerty, "Identification and Control of a Tubular Solid Oxide Fuel Cell ( SOFC)", presented at the Annual AIChE meeting, Philadelphia, 2008.
Praveen K. Cheekatamarla, Caine M. Finnerty, Yanhai Du, Juan Jiang, Jian Dong, P.G. Dewald, C. R. Robinson, Advanced tubular solid oxide fuel cells with high efficiency for internal reforming of hydrocarbon fuels Original Research Article; Journal of Power Sources, vol. 188, Issue 2, Mar. 15, 2009, pp. 521-526.
Praveen K. Cheekatamarla, Caine M. Finnerty, Charles R. Robinson, Stanley M. Andrews, Jonathan A. Brodie, Y. Lu, Paul G. Dewald, "Design, integration and demonstration of a 50 W JP8/kerosene fueled portable SOFC power generator", Original Research Article Journal of Power Sources, vol. 193, Issue 2, Sep. 5, 2009, pp. 797-803.
Debangsu Bhattacharyya, Raghunathan Rengaswamy, Caine Finnerty, "Dynamic modeling and validation studies of a tubular solid oxide fuel call." Original Research Article Chemical Engineering Science, vol. 64, Issue 9, May 1, 2009, pp. 2158-2172.
Zuo, Chendong et al. "Advanced Anode-supported Micro-tubular SOFC Development" ECS Transactions 17.1 (2009): 103-110.
Finnerty, Caine, and David Coimbra, "Anode-supported solid oxide fuel cells using a cermet electrolyte." U.S. Pat. No. 7,498,095, Mar. 3, 2009.

(56) References Cited

OTHER PUBLICATIONS

Finnerty, Caine M. "The catalysis and electrical performance of nickel-based/zirconia fuel forming anodes in solid oxide fuel cells running on methane." Diss. University of Keele, 1998.

Khaligh, Alireza, et al. "Digital control of an isolated active hybrid fuel cell/Li-ion battery power supply." IEEE Transactions on Vehicular technology 56.6 (2007): 3709-3721.

Lankin, Michael, Yanhai Du, and Caine Finnerty, "A review of the implications of silica in solid oxide fuel cells." Journal of Fuel Cell Science and Technology 8.5 (2011): 054001.

* cited by examiner

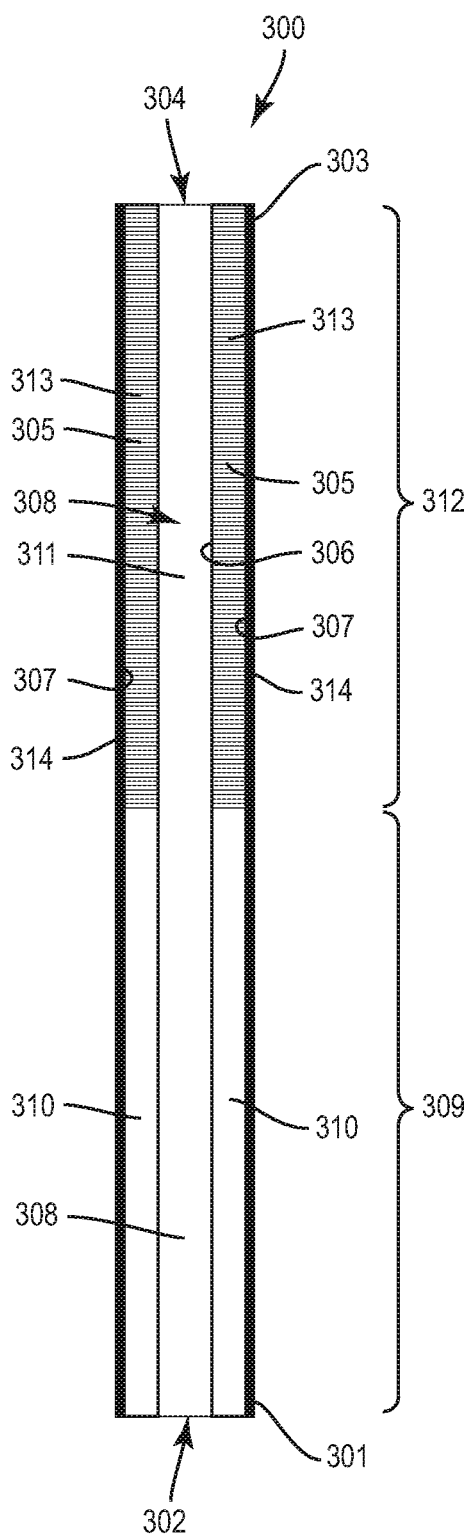
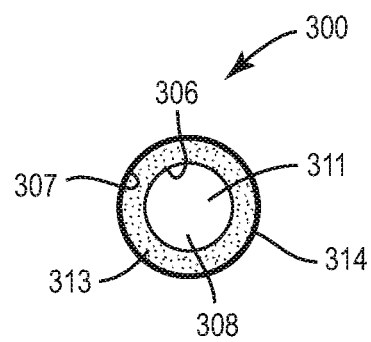
FIG. 3B
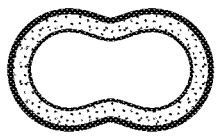
FIG. 3C
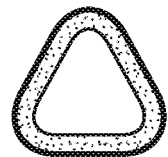
FIG. 3D
FIG. 3A

REFORMER WITH PEROVSKITE AS STRUCTURAL COMPONENT THEREOF

CROSS REFERENCE TO RELATED APPLICATION

This application is a national stage of International Application No. PCT/US2014/063817, which was filed on Nov. 4, 2014, and which claims priority to U.S. Provisional Application No. 61/900,510 filed on Nov. 6, 2013, U.S. Provisional Application No. 61/900,529 filed on Nov. 6, 2013, U.S. Provisional Application No. 61/900,543 filed on Nov. 6, 2013, and U.S. Provisional Application No. 61/900 552 filed on Nov. 6, 2013, the entire contents of each of which are incorporated herein by reference.

BACKGROUND OF THE INVENTION

The present teachings relate to reformers and methods of reforming reformable fuels to produce hydrogen-rich reformates.

The conversion of a reformable fuel to a hydrogen-rich carbon monoxide-containing gas mixture, a product commonly referred to as "synthesis gas" or "syngas," can be carried out in accordance with any of such well known fuel reforming operations as steam reforming, dry reforming, autothermal reforming and catalytic partial oxidation (CPOX) reforming. Each of these fuel reforming operations has its distinctive chemistry and requirements and each is marked by its advantages and disadvantages relative to the others.

The development of improved fuel reformers, fuel reformer components, and reforming processes continues to be the focus of considerable research due to the potential of fuel cells, i.e., devices for the electrochemical conversion of electrochemically oxidizable fuels such hydrogen, mixtures of hydrogen and carbon monoxide, and the like, to electricity, to play a greatly expanded role for general applications including main power units (MPUs) and auxiliary power units (APUs). Fuel cells can also be used for specialized applications, for example, as on-board electrical generating devices for electric vehicles, backup power sources for residential-use devices, main power sources for leisure-use, outdoor and other power-consuming devices in out-of-grid locations and lighter weight, higher power density, ambient temperature-independent replacements for portable battery packs.

Because large scale, economic production of hydrogen, infrastructure required for its distribution and practical means for its storage (especially as a transportation fuel) are widely believed to be a long way off, much current research and development has been directed to improving fuel reformers as sources of electrochemically oxidizable fuels, notably mixtures of hydrogen and carbon monoxide, and fuel cell assemblies, commonly referred to as fuel cell "stacks," as converters of such fuels to electricity, and the integration of reformers and fuel cells into more compact, reliable and efficient devices for the production of electrical energy.

SUMMARY OF THE INVENTION

In accordance with the present invention there is provided a reformer for the production of a hydrogen-rich reformate, the reformer comprising at least one reformer reactor unit having a space-confining wall with external and internal surfaces, at least a section of the wall and space confined thereby defining a reforming reaction zone, an inlet end and associated inlet for admission of a flow of gaseous reforming reactant to the reforming reaction zone, an outlet end and associated outlet for outflow of hydrogen-rich reformate produced in the reforming reaction zone, at least that section of the wall corresponding to the reforming reaction zone comprising perovskite functioning as a structural component thereof, such wall section being gas-permeable to allow gaseous reforming reactant to diffuse therein and hydrogen-rich reformate to diffuse therefrom.

Together with, or without, one or more other materials, perovskites can be readily formed into a wall, or section of wall, of a reformer in accordance with the present teachings employing any of several known and conventional techniques, e.g., molding, casting, extrusion, additive manufacturing, lamination, and the like. The resulting perovskite-containing wall structure can be made to exhibit from good-to-excellent mechanical and thermal properties making them particularly advantageous for the fabrication of wall(s)/wall section(s) of all types of reformers.

Since perovskites catalyze reforming reactions, in particular, steam reforming, autothermal reforming and partial oxidation reforming, they are especially useful as materials for forming the wall(s) or wall section(s) of catalytic reformers. In this capacity, perovskites not only provide or contribute significantly to the mechanical and thermal stability properties of catalytic reformers, they also supply the catalyst, either alone or in combination with one or more other reforming catalysts, for a reforming reaction. Perovskite-containing wall structures corresponding to exothermic reforming reaction zone(s) of, for example, catalytic partial oxidation reformers, are able to very well tolerate the mechanical and thermal stresses resulting from the characteristically high exotherms occurring within such zone(s) and from the rapid and frequent change in operational modes (start-up, steady-state and shut-down) which are common for such reformers.

The features and advantages of the present teachings will be more fully understood from the following figures, description, detailed exemplary embodiments, and claims.

BRIEF DESCRIPTION OF THE DRAWINGS

It should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

FIGS. 3A and 3B are enlarged longitudinal and lateral cross section views, respectively, of a reformer reactor unit such as those in the catalytic partial oxidation reformers of FIGS. 1 and 2.

FIGS. 3C and 3D are enlarged lateral cross section views of two other embodiments of reformer reactor units in accordance with the present teachings.

DETAILED DESCRIPTION OF THE INVENTION

Figure 1:
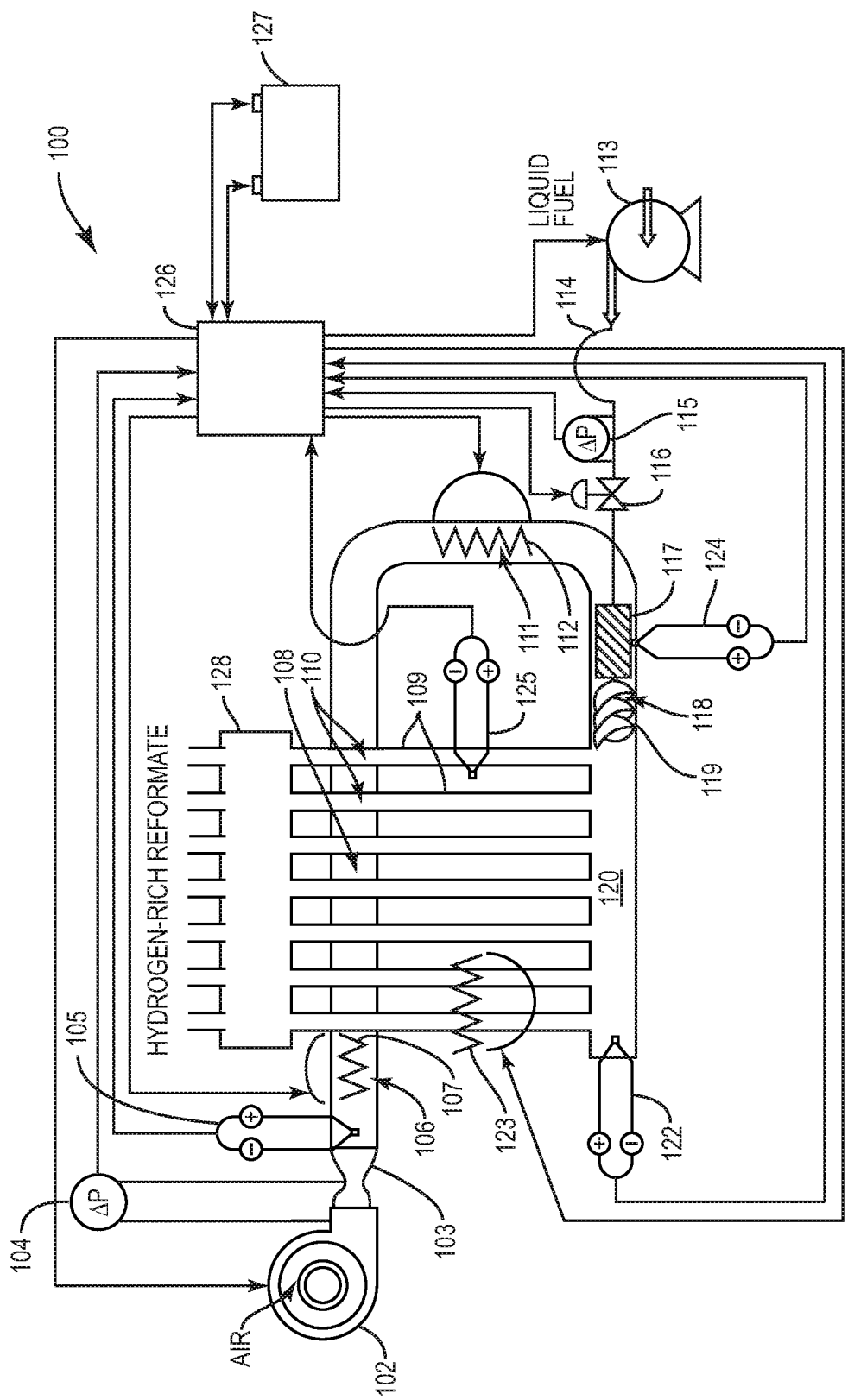
FIGS. 1 and 2 are diagrammatic illustrations of reformers in accordance with the invention, respectively, liquid and gaseous fuel catalytic partial oxidation reformers having a plurality of catalytic partial oxidation reformer reactor units.

It is to be understood that the present teachings herein are not limited to the particular procedures, materials and modifications described and as such can vary. It is also to be understood that the terminology used is for purposes of describing particular embodiments only and is not intended to limit the scope of the present teachings which will be limited only by the appended claims.

Throughout the application, where compositions are described as having, including or comprising specific components, or where methods are described as having, including, or comprising specific method steps, it is contemplated that such compositions also consist essentially of, or consist of, the recited components and that such methods also consist essentially of, or consist of, the recited method steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the focus and scope of the present teachings whether explicit or implicit therein. For example, where reference is made to a particular structure, that structure can be used in various embodiments of the apparatus and/or method of the present teachings.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, two or more steps or actions can be conducted simultaneously.

At various places in the present specification, values are disclosed in groups or in ranges. It is specifically intended that a range of numerical values disclosed herein include each and every value within the range and any subrange thereof. For example, a numerical value within the range of 0 to 20 is specifically intended to individually disclose 0, 1, 2, 3, 4, 5, 6, 7, 8, 9, 10, 11, 12, 13, 14, 15, 16, 17, 18, 19 and 20, and any subrange thereof, for example, from 0 to 10, from 8 to 16, from 16 to 20, etc.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or attitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of liquid fuel CPOX reformers of the present teachings illustrated in certain of the accompanying figures.

The term "ceramic," in addition to its art-recognized meaning, shall be understood herein to include glasses, glass-ceramics and cermets (i.e., ceramic-metal composites).

The expression "gas permeable" as it applies to a wall of a CPOX reactor unit herein shall be understood to mean a wall structure that is permeable to gaseous CPOX reaction mixtures and gaseous product reformate including, without limitation, the vaporized liquid or gaseous reformable fuel component of the gaseous CPOX reaction mixture and the hydrogen component of the product reformate.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates.

The term "reformer" shall be understood to include any device or apparatus in which one or more reforming reactions resulting in the conversion of reformable fuel to a hydrogen-rich reformate take place. The term "reformer" therefore applies to reactors in which such operations as steam reforming, dry reforming, autothermal reforming, catalytic partial oxidation (CPOX) reforming or a combination of two or more such reforming operations takes place, and to fuel cells having internal reforming capability.

The expression "reforming reaction" shall be understood to include the reaction(s) that occur during reforming or conversion of a reformable fuel to a hydrogen-rich reformate.

The expression "reforming reaction mixture" refers to a mixture including a vaporized liquid reformable fuel, a gaseous reformable fuel or combinations thereof, an oxidizer, for example, oxygen supplied as air, and in the case of steam or autothermal reforming, steam.

The expression "catalytic reforming" shall be understood to refer to any and all reforming reactions that are, or may be, carried out in the presence of a reforming catalyst and specifically include, without limitation, steam reforming authothermal reforming and catalytic partial oxidation (CPOX) reforming.

Figure 2:
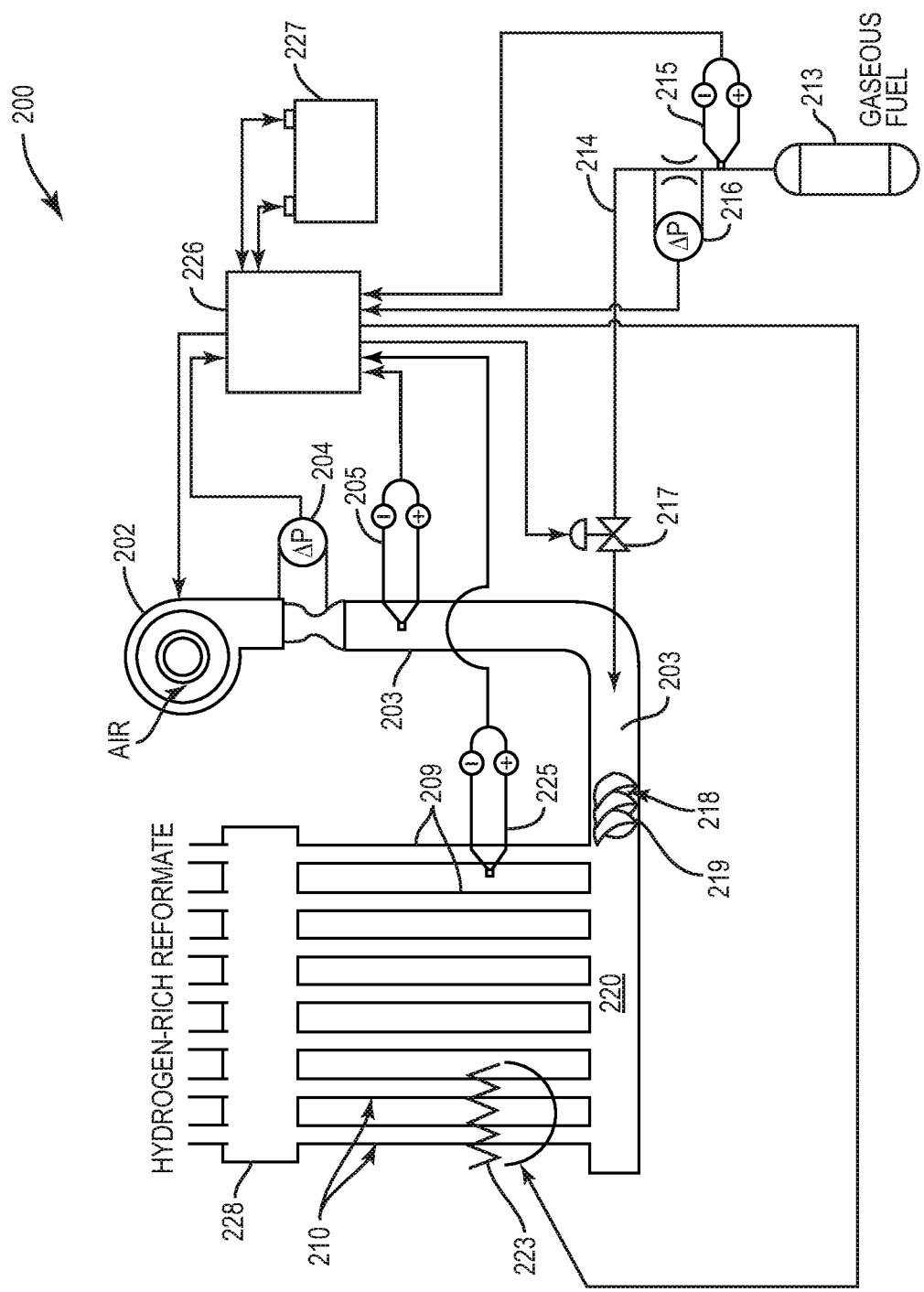

FIGS. 1 and 2 illustrate embodiments of reformers constructed in accordance with the present teachings that are specific to CPOX reforming. These reformer embodiments are for illustration purposes only and are not to be regarded as limiting the scope of the invention.

As shown in FIG. 1, liquid fuel CPOX reformer 100 includes centrifugal blower 102 for introducing oxygen-containing gas, exemplified here and in the other embodiments of the present teachings by air, into conduit 103, and for driving this and other gaseous streams (inclusive of vaporized liquid fuel-air mixture(s) and hydrogen-rich reformates) through the various gaseous flow passageways of the reformer. Conduit 103 can include flow meter 104 and thermocouple 105. These and similar devices can be placed at various locations within a liquid fuel gas phase CPOX reformer in order to monitor and control its operation.

In a start-up mode of operation of exemplary liquid fuel gas phase CPOX reformer 100, air at ambient temperature, introduced by centrifugal blower 102 into conduit 103, passes through first heating zone 106 where the air is initially heated by first heater 107, for example, of the electrical resistance type, to within a preset, or targeted, first range of elevated temperature at a given rate of flow. The initially heated air then passes through heat transfer zone 108 which in the steady-state mode of operation of CPOX reformer 100 is heated by heat of exotherm recovered from the gas phase CPOX reaction occurring within gas phase CPOX reaction zones 110 of tubular CPOX reactor units 109. Once such steady-state operation of reformer 100 is achieved, i.e., upon the CPOX reaction within CPOX reactor units 109 becoming self-sustaining, the thermal output of first heater 107 can be reduced or its operation discontinued since the incoming air will have already been heated by passage through heat transfer zone 108 to within, or approaching, its first range of elevated temperature.

Continuing further downstream within conduit 103, the air which has initially been heated, either by passage through first heating zone 106 during a start-up mode of operation or by passage through heat transfer zone 108 during a steady-state mode of operation, passes through second heating zone 111 where it is further heated by second heater 112, which can also be of the electrical resistance type, to within a second range of elevated temperature. Second heater 112 can operate to top-off the temperature of the previously heated air thereby satisfying several operational requirements of liquid fuel CPOX reformer 100, namely, assisting in the regulation and fine-tuning of the thermal requirements of the reformer on a rapid response and as-needed basis, providing sufficient heat for the subsequent vaporization of liquid reformable fuel introduced further downstream into conduit 103 and providing heated gaseous CPOX reaction mixture.

Liquid reformable fuel such as diesel is continuously introduced via pump 113 through fuel line 114 equipped with optional flow meter 115 and optional flow control valve 116 and into conduit 103 where the fuel is vaporized by vaporizer system 117 utilizing heat from the heated air flowing from second heating zone 111. The vaporized, i.e., now gaseous, fuel combines with the stream of heated air in mixing zone 118 of conduit 103. A mixer, for example, a static mixer such as in-line mixer 119, and/or vortex-creating helical grooves formed within the internal surface of conduit 103, or an externally powered mixer (not shown), are disposed within mixing zone 118 of conduit 103 in order to provide a more uniform fuel-air gaseous CPOX reaction mixture than would otherwise be the case.

The heated vaporized fuel-air mixture (heated gaseous CPOX reaction mixture) enters manifold, or plenum, 120 which functions to distribute the reaction mixture more evenly and, for example, at a more uniform temperature, into tubular gas phase CPOX reactor units 109 the perovskite-containing CPOX catalyst-containing wall structures of which are described in greater detail in connection with the representative embodiments of CPOX reactor unit illustrated in FIGS. 4A-4D. Conduit 103 and manifold 120 will ordinarily be surrounded by thermal insulation to prevent heat loss through these structures.

From manifold 120, the heated CPOX reaction mixture is introduced into tubular gas phase CPOX reactor units 109. In a start-up mode of operation of CPOX reformer 100, igniter 123 initiates the CPOX reaction of the gaseous CPOX reaction mixture within CPOX reaction zones 110 of perovskite-containing tubular CPOX reactor units 109 thereby commencing the production of hydrogen-rich reformate. Once steady-state CPOX reaction temperatures have been achieved (e.g., 250° C. to 1,100° C.), the reaction becomes self-sustaining and operation of the igniter can be discontinued. Thermocouples 124 and 125 are provided to monitor the temperatures of, respectively, the vaporization operation occurring within conduit 103 and the gas phase CPOX reaction occurring within CPOX reactor units 109, the temperature measurements being relayed as monitored parameters to reformer control system 126.

Reformer 100 can also include a source of electrical current, for example, rechargeable lithium-ion battery system 127, to provide power for its electrically driven components such as centrifugal blower system 102, flow meters 104 and 115, heaters 107 and 112, liquid fuel pump 113, flow control valve 116, igniter 123, and thermocouples 105, 122, 124 and 125 and, if desired, to store electricity for later use.

If desired, product effluent or hydrogen-rich reformate from liquid fuel CPOX reformer 100 can be introduced into one or more conventional or otherwise known carbon monoxide removal devices 128 for the reduction of its carbon monoxide (CO) content, for example, where the product effluent is to be introduced as fuel to a fuel cell stack utilizing a catalyst that is particularly susceptible to poisoning by CO, for example, a polymer electrolyte membrane fuel cell. Thus, for example, the product effluent can be introduced into a water gas shift (WGS) converter wherein CO is converted to carbon dioxide ($CO_2$) while at the same time producing additional hydrogen, or the product effluent can be introduced into a reactor wherein CO is made to undergo preferential oxidation (PROX) to $CO_2$. CO reduction can also be carried out employing a combination of these processes, for example, WGS followed by PROX and vice versa.

It is also within the scope of the present teachings to reduce the level of CO in the product reformate by passage of the product reformate through a known or conventional clean-up unit or device equipped with a hydrogen-selective membrane providing separation of the product reformate into a hydrogen stream and a CO-containing by-product stream. Units/devices of this kind can also be combined with one or more other CO-reduction units such as the aforementioned WGS converter and/or PROX reactor.

As shown in FIG. 2, gaseous fuel CPOX reformer 200 includes centrifugal blower 202 for introducing air into conduit 203 and for driving this and other gaseous streams (inclusive of gaseous fuel-air mixture(s) and hydrogen-rich reformates) through the various passageways, including open gaseous flow passageways, of the gas phase CPOX reformer. Conduit 203 can include flow meter 204 and thermocouple 205. These and similar devices can be placed at various locations within CPOX reformer 200 in order to monitor and control its operation.

In a start-up mode of operation of exemplary gaseous fuel CPOX reformer 200, air introduced by centrifugal blower system 202 into conduit 203 combines with gaseous reformable fuel such as propane, introduced into conduit 203 at a relatively low pressure from gaseous fuel storage tank 213 through fuel line 214 equipped with optional thermocouple 215, flow meter 216, and flow control valve 217. The air and propane combine in mixing zone 218 of conduit 203. A mixer, for example, a static mixer such as in-line mixer 219, and/or vortex-creating helical grooves formed within the internal surface of conduit 203, or an externally powered mixer (not shown), are disposed within mixing zone 218 of conduit 203 to provide a more uniform propane-air gaseous CPOX reaction mixture than would otherwise be the case.

The propane-air mixture (i.e., gaseous CPOX reaction mixture) enters manifold, or plenum. 220 which functions to distribute the reaction mixture more evenly into perovskite-containing tubular CPOX reactor units 209 respective embodiments of which are illustrated in detail in FIGS. 3A-3D. In a start-up mode of operation of CPOX reformer 200, igniter 223 initiates the gaseous phase CPOX reaction of the gaseous CPOX reaction mixture within CPOX reaction zones 210 of tubular CPOX reactor units 209 thereby commencing the production of hydrogen-rich reformate. Once steady-state CPOX reaction temperatures have been achieved (e.g., 250° C. to 1,100° C.), the reaction becomes self-sustaining and operation of the igniter can be discontinued. Thermocouple 225 is positioned proximate to one or more CPOX reaction zones 210 to monitor the temperature of the CPOX reaction occurring within CPOX reactor units 209, the temperature measurement being relayed as a monitored parameter to reformer control system 226.

Reformer 200 can also include a source of electrical current, for example, rechargeable lithium-ion battery system 227, to provide power for its electrically driven components such as centrifugal blower system 202, flow meters 204 and 216, flow control valve 217, and igniter 223.

As in the case of carbon monoxide removal device(s) 128 of CPOX reformer 100, gaseous fuel CPOX reformer 200 can include similarly operable carbon monoxide removal device(s) 228.

FIGS. 3A and 3B illustrate, respectively, enlarged longitudinal and lateral cross section views of a tubular-shaped CPOX reactor unit 300 in accordance with the present teachings which is suitable for incorporation in a reformer such as the CPOX reformers of FIGS. 1 and 2.

As shown in FIGS. 3A and 3B, reformer reactor unit 300 of a catalytic reformer such as a liquid or gaseous fuel CPOX reformer includes an inlet end 301 and associated inlet 302 for the admission of a flow of gaseous CPOX reaction mixture, an outlet end 303 and associated outlet 304 for the outflow of hydrogen-rich reformate, and gas-permeable wall 305 comprising one or more perovskites as structural components thereof, either alone or together with one or more additional components such as refractory metal, catalytically inactive ceramic, refractory binder and reforming catalyst other than perovskite. Perovskite-containing gas-permeable wall 305 further includes inner surface 306, outer surface 307 and open gaseous flow passageway 308 confined by wall 305, more particularly, by inner wall surface 306.

Open gaseous flow passageway 308 is conducive to the maintenance of low back pressure within the reformer by allowing for the substantially unimpeded inflow of gaseous reaction mixture and outflow of hydrogen-containing reformate. Thus, in the operation of a reformer in accordance with the present teachings, back pressures of not more than about 3 inches of water (0.0075 bar), for example, not more than about 2 inches of water, or not more than about 1 inch of water, are readily achievable.

If desired, and in the embodiment of reactor unit 300 shown, the reactor can be divided into two main regions, a first, or upstream, region 309 and corresponding wall section 310 extending from inlet end 301 to reforming reaction zone 311 and being substantially devoid of reforming catalyst, and second, or downstream, region 312 being coterminous with exothermic reforming reaction zone 311 with only its corresponding wall section 313 comprising perovskite, with or without additional material(s), as structural component(s) thereof. Second region 312 can extend from its boundary with first region 309 to or near outlet 304. The length of first and second regions 309 and 312 relative to the entire length of reactor unit 300 can vary considerably. Thus, for example, first region 309 can extend from about 20% to about 60%, for example, from about 30% to about 50%, of the length of reactor unit 300, with second region 312 extending the remainder of the length of the CPOX reactor unit.

The division of reactor unit 300 into first and second regions allows the hot reforming reaction to be largely confined to second region 312 and first region 309 to remain at a considerably lower temperature, for example, in the region of from ambient up to about 350° C., particularly at the juncture of fuel-air mixture inlet end 301 of reactor unit 300 and manifold 120 of liquid fuel CPOX reformer 100 of FIG. 1, and manifold 220 of gaseous fuel CPOX reformer 200 of FIG. 2. The lower temperature of substantially catalyst-free first region 309, which temperature is lower than the melting temperature of many thermoplastic resins and below the thermal degradation temperature of many thermoset resins, makes it practical and advantageous to utilize any of several families of thermoplastic and thermoset resins for the manufacture of the manifold. Specific types of thermoplastic and thermoset resins that can be used for the fabrication of aforementioned manifolds 120 and 220 include polyetherimide (PEI), polyaryletherketones (PAEKs) such as polyether ether ketone (PEEK), phenol-formaldehyde resins, and the like. These and other thermally stable resins, in addition to their relatively low material cost, have the added advantage of being readily formable into complex shapes employing low cost manufacturing procedures such as extrusion molding, vacuum molding, injection molding, reaction injection molding, rotational molding, and the like, and are therefore well suited for making manifolds having relatively complex geometries.

To prevent or inhibit the loss of product hydrogen through gas-permeable wall 305, a hydrogen barrier 314 can be attached to the entire outer surface 307 of the wall, or at least the outer surface of wall section 313 corresponding to reforming reaction zone 311. Materials capable of functioning as effective hydrogen barriers should be thermally stable at the temperatures typical of reforming reactions and should be sufficiently dense to prevent or deter permeation or diffusion of reformate gases, particularly hydrogen, therethrough. A variety of ceramic materials (inclusive of glasses and glass-ceramics) and metals meeting these requirements are known and are therefore suitable for providing hydrogen barrier 314. Specific materials for hydrogen barrier 314 include, for example, aluminum, nickel, molybdenum, tin, chromium, alumina, recrystallized alumina, aluminides, alumino-silicates, titania, titanium carbide, titanium nitride, boron nitride, magnesium oxide, chromium oxide, zirconium phosphate, ceria, zirconia, mulite and the like, admixtures thereof and layered combinations thereof.

Where the nature of the material constituting hydrogen barrier 314 permits, the hydrogen barrier can be applied to at least that portion of an outer surface of a reactor unit wall corresponding to the reforming reaction zone as a preformed layer, foil, film or membrane. The hydrogen barrier can be bonded to the wall with a refractory adhesive. Alternatively, hydrogen barrier 314 can be formed on an outer surface by employing any suitable deposition method, for example, any of the conventional or otherwise known ceramic-coating and metal-coating techniques such as spray coating, powder coating, brush coating dipping, casting, co-extrusion, metallizing, and the like, and any of their many variations. A suitable range of thickness for a hydrogen barrier will depend primarily on the hydrogen permeability characteristics of the selected barrier material and the gas permeability characteristics of the wall enclosing the reforming reaction zone, such thickness being readily determined by those skilled in the art employing known and conventional experimental techniques. For many barrier materials and perovskite-containing reactor wall structures, the thickness of hydrogen barrier 314 can vary from about 2 microns to about 15 microns, for example, between about 5 microns to 12 microns.

As those skilled in the art will readily recognize and appreciate, the cross sectional configuration and dimensions of a reforming reactor unit and, in reformers having a plurality, or array of such reactor units, the number of reactor units and the distances of their separation from each other measured from their geometric centers, or centroids, will be made to depend on the operational and mechanical performance specifications for a particular reforming reactor. In the case of a reforming reactor unit of substantially uniform circular cross section, for example, reformer reactor unit 300 illustrated in FIGS. 3A and 3B, the length, internal and external diameters (defining the thickness of the gas-permeable wall) and the location, length and thickness of the hydrogen barrier attached to the outer surfaces of the gas-permeable wall will be determined by, among other things, the hydrogen-producing capacity of the reformer, which in turn is a function of several factors including the type, amount (loading and distribution of reforming catalyst, i.e., perovskite, and any other reforming catalyst(s) that may be present within the gas-permeable wall), the characteristics of the porous structure of the wall (characteristics influencing the gas-permeability of the walls and therefore affecting the reforming reaction) such as pore volume (a function of pore size), the principal type of pore (mostly open, i.e., reticulated, or mostly closed, i.e., non-reticulated), and pore shape (spherical or irregular), the volumetric flow rates of the reforming reaction mixture, reforming reaction temperature, back pressure, and the like.

In addition, a hydrogen barrier can be a pressurized fluid such as a pressurized gas associated with the external surface of a gas-permeable wall of a CPOX reactor unit, for example, at least the CPOX catalyst-containing wall section. With sufficient pressure, a pressurized fluid exterior to a CPOX reactor unit can create a barrier to prevent the loss of hydrogen through the gas-permeable wall that forms the CPOX reactor unit. Pressurized fluids typically are pressurized gases, such as inert gases (e.g., nitrogen) and/or air. The use of pressurized air as a hydrogen barrier has the additional advantage of oxygen diffusing from the exterior to the interior of the CPOX reactor unit, which diffused oxygen can adjust the O:C ratio of the gaseous CPOX reaction mixture about to and/or being reformed, particularly where such a hydrogen barrier is used and present around the CPOX reaction zone.

In certain embodiments, the CPOX reactor units can be located in an air-tight chamber but for their inlets and outlets thereby to permit pressurization of a fluid such as a gas in the environment exterior to the CPOX reactor units, which pressurized gas can create a hydrogen barrier associated with the external surfaces of the CPOX reactor units. In particular embodiments, because hydrogen is not produced in a CPOX reactor unit until the CPOX reaction zone, only the CPOX reaction zones of the CPOX reactor units are enclosed in an air-tight chamber that is pressurized with a fluid such as air. In embodiments where the CPOX reaction zone does not extend to the outlet of the CPOX reactor units, the beginning of the CPOX reaction zone to the outlet can be enclosed in an air-tight chamber to permit a pressurized gas to be used as a hydrogen barrier. In some designs, a chamber as described herein can encompass a portion of the CPOX reaction zone while another form of a hydrogen barrier can be present encompassing the remainder of the CPOX reaction zone.

In the embodiments where a chamber is used, such as an air-tight chamber, a conduit in fluid communication with the interior of the chamber can be used to pressurized the chamber with a fluid. For example, a pressurized fluid or gas conduit can provide operable fluid communication between the interior of the (air-tight) chamber and a source of pressurized or compressed fluid, such as a container a compressed gas such as compressed air.

Reformer reactor unit 300, in addition to the circular cross section shown in FIG. 3B, can assume other cross sectional configurations such as those illustrated in FIGS. 3C and 3D. FIG. 3C illustrates a reformer reactor unit having an alternating concave-convex, or bilobate, cross section. Reformer reactor units having such a cross sectional configuration can be especially advantageous where their outlet sections are to be joined to, or mated with, similarly configured tubular solid oxide fuel cell units as in the fuel cell assembly of co-pending, commonly assigned Finnerty et al. published U.S. patent application No. 2013/0230787, the entire contents of which are incorporated by reference herein.

The desired mechanical performance characteristics of a particular reformer will depend to a considerable extent on such factors as the thermal and mechanical properties of the perovskite and other materials, if utilized, used for the construction of the reformer reactor units, the volume and morphology of the pores of the gas-permeable structure of the walls of the reformer reactor units, the dimensions of the reformer reactor units, particularly wall thickness, and related factors as those skilled in the art recognize and appreciate.

For a reformer to suitably function, the gas permeability property of the perovskite-containing catalytically active wall structure of the at least one reformer reactor unit must be such as to allow the reformable fuel to freely enter and diffuse through such wall structure thereby making effective contact not only with surface catalyst but interior catalyst as well. It should be noted that reformer reactor unit wall structures having limited gas permeability for the reformable fuel can be mass transport limited so as to impede significantly reforming of the fuel to hydrogen-rich reformate. By contrast, perovskite-containing catalytically active reactor wall structures of suitable gas permeability promote reforming of reformable fuels and selectivity for the production of hydrogen-rich reformates of desirable composition. Guided by the present teachings and employing known and conventional testing procedures, those skilled in the art can readily construct reformers having perovskite-containing wall structures exhibiting optimal gas permeability properties for a particular reformable fuel to be processed.

Perovskites possess catalytic activity for reforming reactions such as steam reforming, autothermal reforming and CPOX reforming and are therefore useful not only for the fabrication of the wall structure of catalytic reformers corresponding to their reforming reaction zones, they can also supply part or even all of the reforming catalyst.

Any of the conventional and otherwise known perovskites can be utilized herein for the construction of the wall(s) and/or wall section(s) of reformers of all types, including those of the catalytic and non-catalytic variety. Suitable perovskites are described, for example in U.S. Pat. Nos. 4,321,250; 4,511,673; 5,149,516; 5,447,705, 5,714,091; 6,143,203; 6,379,586; 7,070,752; 7,151,067; 7,410,717; and 8,486,301, and in published U.S. patent applications 2012/0161078; 2012/0189536; and, 2012/0264597, the entire contents of which are incorporated by reference herein.

Perovskite catalysts are a class of reforming catalyst useful in the present teachings as they are also suitable for the construction of the catalytically active wall structures of a catalytic reformer. Perovskite catalysts are characterized by the structure $ABX_3$ where "A" and "B" are cations of very different sizes and "X" is an anion, generally oxygen, that bonds to both cations. Examples of suitable perovskite CPOX catalysts include $LaNiO_3$, $LaCoO_3$, $LaCrO_3$, $LaFeO_3$ and $LaMnO_3$.

A-site modification of the perovskites generally affects their thermal stability while B-site modification generally affects their catalytic activity. Perovskites can be tailor-modified for particular catalytic reforming reaction conditions by doping at their A and/or B sites. Doping results in the atomic level dispersion of the active dopant within the perovskite lattice thereby inhibiting degradations in their catalytic performance. Perovskites can also exhibit excellent tolerance to sulfur at high temperatures characteristic of catalytic reforming. Examples of doped perovskites useful as reforming catalysts include $La_{1-x}Ce_xFeO_3$, $LaCr_{1-y}Ru_yO_3$, $La_{1-x}Sr_xAl_{1-y}Ru_yO_3$ and $La_{1-x}Sr_xFeO_3$ wherein x and y are numbers ranging, for example, from 0.01 to 0.5, from 0.05 to 0.2, etc., depending on the solubility limit and cost of the dopants. Some specific perovskites that can be utilized for the construction of the wall(s)/wall section(s) of the reformer herein are lanthanum strontium manganite (LSM), lanthanum strontium ferrite (LSF), lanthanum strontium cobalt ferrite (LSCF), lanthanum calcium manganite (LCM), lanthanum strontium chromite (LSC), lanthanum strontium gallate magnesite (LSGM), their mixtures with each other and with other perovskites.

The total amount of perovskite employed in the fabrication of the reformer wall(s)/wall section(s) can vary over fairly wide limits provided such amount contributes significantly to their mechanical strength. In general, the entire wall of the reformer, or in the case of CPOX reformer reactor 300 whose reforming reaction zone is limited to second region 312, just wall section 313 corresponding to CPOX reaction zone 311, can contain at least 20 weight percent, for example, at least 50 weight percent, and in other embodiments, at least 80 weight percent and up to 100 weight percent, perovskite.

The present teachings also contemplate the optional additional use of any of the heretofore conventional and otherwise known non-perovskite CPOX catalysts and catalyst systems. Among the many known and conventional non-perovskite reforming catalysts that can optionally be utilized herein are the metals, metal alloys, metal oxides, mixed metal oxides, pyrochlores, their mixtures and combinations, including various ones of which are disclosed, for example, in U.S. Pat. Nos. 5,149,156; 5,447,705; 6,379,586; 6,402,989; 6,458,334; 6,488,907; 6,702,960; 6,726,853; 6,878,667; 7,070,752; 7,090,826; 7,328,691; 7,585,810; 7,888,278; 8,062,800; and, 8,241,600, the entire contents of which are incorporated by reference herein.

While numerous highly active noble metal-containing reforming catalysts are known and as such can be useful herein, they are generally less often employed than other known types of reforming catalysts due to their high cost, their tendency to sinter at high temperatures and consequently undergo a reduction in catalytic activity, and their proneness to poisoning by sulfur.

In addition to perovskites and other optional reforming catalysts, other materials from which wall(s) and wall section(s) of reformers constructed in accordance with the present teachings can be fabricated include conventional and otherwise known refractory metals, ceramics, refractory binders and combinations thereof.

Among the useful metals are titanium, vanadium, chromium, zirconium, molybdenum, rhodium, tungsten, nickel, iron and the like, their combinations with each other and/or with other metals and/or metal alloys, and the like.

Ceramics are an especially attractive class of materials for the construction of reformer wall structures due to their relatively low cost compared to many of the refractory metals and metal alloys that are also useful for this purpose. The comparative ease with which such ceramics can be formed into tubular gas-permeable structures of fairly reproducible pore type employing known and conventional pore-forming procedures and the generally highly satisfactory structural/mechanical properties of ceramics (including coefficients of thermal expansion and thermal shock performance) and resistance to chemical degradation make them particularly advantageous materials. Suitable ceramics include the entire wall structure of a CPOX reactor unit) include, for example, spinels, magnesia, ceria, stabilized ceria, silica, titania, zirconia, stabilized zirconia such as alumina-stabilized zirconia, calcia-stabilized zirconia, ceria-stabilized zirconia, magnesia-stabilized zirconia, lanthana-stabilized zirconia and yttria-stabilized zirconia, zirconia stabilized alumina, pyrochlores, brownmillerites, zirconium phosphate, silicon carbide, yttrium aluminum garnet, alumina, alpha-alumina, gamma-alumina, beta-alumina, aluminum silicate, cordierite, magnesium aluminate, and the like, various ones of which are disclosed in U.S. Pat. Nos. 6,402,989 and 7,070,752, the entire contents of which are incorporated by reference herein; and, rare earth aluminates and rare earth gallates various ones of which are disclosed in U.S. Pat. Nos. 7,001,867 and 7,888,278, the entire contents of which are incorporated by reference herein.

Refractory binders that can be useful for the fabrication of the wall(s)/wall section(s) of a reformer include conventional and otherwise known materials as calcium aluminate, silica and alumina admixed with one or more metal oxides such as calcium oxide, strontium oxide and sodium oxide.

Figure 4:
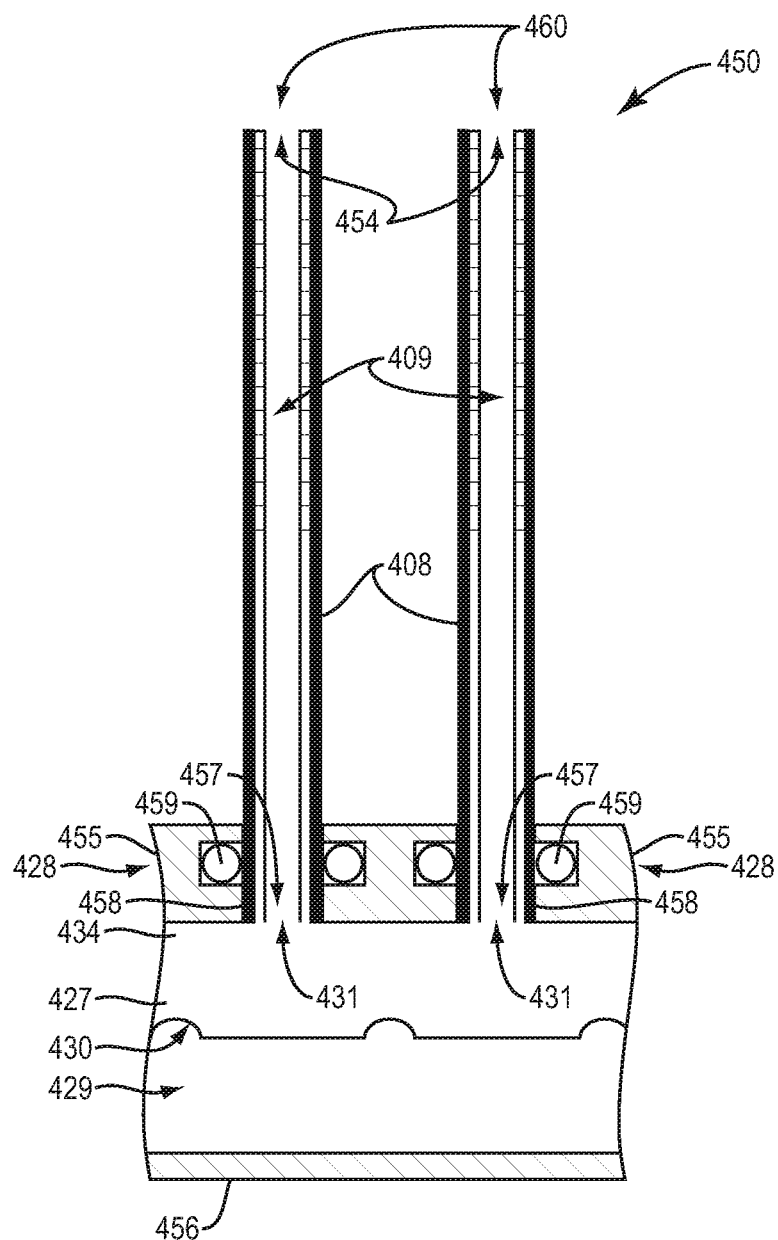
FIG. 4 is an enlarged longitudinal cross section view of a portion of the manifold and associated reformer reactor units of the reformers illustrated in FIG. 1.

FIG. 4 is an enlarged longitudinal cross section view of a section of manifold 120 of the liquid fuel CPOX reformer of FIG. 1 together with associated perovskite-containing tubular CPOX reactor units 408. As shown in FIG. 4, manifold section 450 of manifold 426 includes upper housing structure 455, lower housing structure 456, manifold chamber 429, gaseous CPOX reaction mixture (gas) distributor 427 and gas distributor outlets 430 in gaseous flow communication with inlets 431 of tubular CPOX reactor units 408. Inlet ends 457 of tubular CPOX reactor units 408 are firmly seated within cavities 458 formed within upper housing structure 455 and are engaged in gas-tight relationship therewith by O-ring gaskets 459. Heated gaseous CPOX reaction mixture flows through outlets 430 of gas distributor 427, through inlets 431 of tubular CPOX reactor units 408 and into CPOX reaction zones 409 where the gaseous CPOX reaction mixture undergoes gaseous phase CPOX conversion to a hydrogen-rich, carbon monoxide-containing effluent reformate exiting the reactor units at their outlet ends 460 through associated outlets 454.

Figure 5:
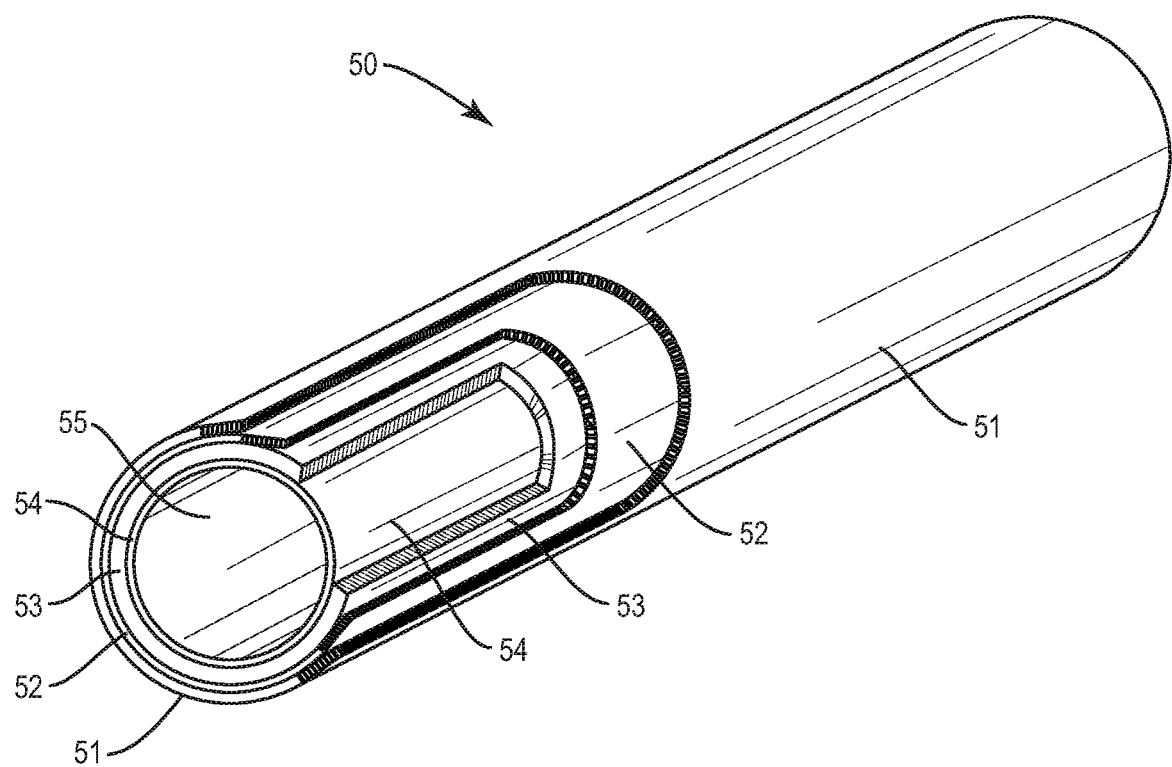
FIG. 5 is an isometric view of a generally cylindrical tubular solid oxide fuel cell including a perovskite-containing reformer in accordance with the present teachings.

It is also within the scope of the invention to incorporate the reformer of this invention as the reforming component of a tubular solid oxide fuel cell (SOFC) thereby providing an internal reforming (IRSOFC). One such IRSOFC is illustrated in FIG. 5. As shown therein, and as described from its outermost to innermost surfaces, IRSOFC 50 includes cathode component 51, intermediate electrolyte component 52, anode component 53 and perovskite-containing reformer component 54 defining passageway CPOX reaction zone 55. Gaseous CPOX fuel-air reaction mixture entering passageway 55 undergoes CPOX reforming within reformer component 54 thereby supplying hydrogen-rich reformate to adjacent anode component 53, hydrogen-fueled IRSOFC operating in known manner to produce electrical current.

Those skilled in the art, taking into account the various embodiments of the reformer described herein and the principles of operation of the same, by employing routine experimental procedures can readily optimize the design of a particular reformer of desired reformable fuel conversion capacity, structural characteristics and mechanical properties in accordance with the present teachings.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

The invention claimed is:

1. A reformer comprising at least one reformer reactor unit, the at least one reformer reactor unit comprising:
   a tubular space-confining wall with an external surface and an internal surface defining an interior confined space,
   a reaction section of the wall defining a reforming reaction zone confined by the external and internal surfaces of the portion of the wall defining the reaction section,
   an inlet end and an associated inlet adapted to admit and direct a flow of a gaseous reforming reactant into the confined space,
   an outlet end and an associated outlet adapted to direct an outflow from the confined space of a hydrogen-rich reformate produced in the reaction section of the wall, the reaction section of the wall comprising perovskite as a CPOX catalyst between the internal and external surfaces within the wall and as a structural component of the reaction section of the wall, such reaction section of the wall being gas-permeable and the at least one reformer reactor unit adapted to cause the gaseous reforming reactant flowing through the confined space to diffuse into the reaction section of the wall, interact with the perovskite CPOX catalyst within the wall, generate hydrogen and produce a hydrogen-rich reformate and to cause the hydrogen-rich reformate to diffuse from the wall to the confined space.

2. The reformer of claim 1 which is a catalytic reformer, and including an additional CPOX catalyst in the reaction section of the wall n addition to the perovskite CPOX catalyst within the wall.

3. The reformer of Claim I comprising a plurality of the reformer reactor unit, the plurality of reformer reactor units each having a tubular configuration and a respective wall with an inner surface defining a hollow open gaseous flow passageway, with a perovskite CPOX catalyst within and forming the wall and no catalyst impeding the open passageway from an inlet of each. reformer reactor unit to an outlet of each reformer reactor unit.

4. The reformer of claim 1 wherein perovskite comprises at least 20 weight percent of the structure of the reaction section of the wall.

5. The reformer of claim 1 wherein perovskite comprises at least 50 weight percent of the structure of the reaction section of the wall.

6. The reformer of claim 1 wherein perovskite comprises from 80 to 100 weight percent of the structure of the reaction section of the wall.

7. The reformer of claim 1 wherein the reaction section of the wall further comprises a metal, a ceramic, a refractory binder or a reforming catalyst other than perovskite.

8. The reformer of claim 1 wherein a hydrogen barrier surrounds the external surface of the reaction section of the wall.

9. The reformer of claim 1 wherein the perovskite comprises $LaNiO_3$, $LaCoO_3$, $LaCrO_3$, $LaFeO_3$ or $LaMnO_3$.

10. The reformer of Claim I wherein the perovskite CPOX catalyst comprises $La_{1-x}Ce_xFe_2O_3$, $LaCr_{1-y}Ru_yO_3$, $La_{1-x}Sr_xAl_{1-y}Ru_yO_3$ and $La_{1-x}Sr_xFe_2O_3$ wherein x and y are numbers ranging from 0.01 to 0.5.

11. The reformer of claim 1 wherein the perovskite comprises lanthanum strontium manganite, lanthanum strontium ferrite, lanthanum strontium cobalt ferrite, lanthanum calcium manganite, lanthanum strontium chromite or lanthanum strontium gallate magnesite.

12. The reformer of claim 1 in which the space-confining wall of the at least one reformer reactor unit is divided into two regions, a first region extending in a downstream direction from the inlet of the confined space to the reforming reaction zone, the first region being substantially devoid of a reforming catalyst, and a second region including the reforming reaction zone, extending from the first region to the outlet of the confined space.

13. The reformer of claim 1 which is a tubular solid oxide fuel cell having an anode component, an electrolyte component, a cathode component and a reformer component adjacent to the anode component.

14. A method of CPOX reforming, comprising using the reformer of claim 1 and diffusing the gaseous reforming reactant between the external and internal surfaces of the wall, performing CPOX reforming in the reaction section of the wall, and diffusing the reformate to the confined space, wherein the perovskite functions as a CPOX catalyst.

15. A method of CPOX reforming, comprising using the reformer of claim 3, and causing the gaseous reforming reactant to flow, unobstructed, through the open gaseous flow passageway and to diffuse into the wall and interact with the perovskite CPOX catalyst within the wall.

16. The reformer of claim 3, wherein each reactor unit comprises an additional CPOX catalyst in addition to the perovskite CPOX catalyst.

\* \* \* \* \*